(12) United States Patent  
Tabata

(10) Patent No.: US 7,887,421 B2
(45) Date of Patent: Feb. 15, 2011

(54) VIDEO GAME CONTROL SYSTEM AND A VIDEO GAME CONTROL SERVER

(75) Inventor: Hajime Tabata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 820 days.

(21) Appl. No.: 11/856,153

(22) Filed: Sep. 17, 2007

(65) Prior Publication Data

US 2008/0076578 A1  Mar. 27, 2008

(30) Foreign Application Priority Data

Sep. 21, 2006 (JP) ............................. 2006-256531

(51) Int. Cl.
*A63F 9/24* (2006.01)
(52) U.S. Cl. ................................ 463/42; 463/9; 463/37
(58) Field of Classification Search .................. 463/42, 463/9, 37
See application file for complete search history.

(56) References Cited

U.S. PATENT DOCUMENTS

| | | | |
|---|---|---|---|
| 6,569,011 | B1 | 5/2003 | Lynch et al. |
| 6,733,392 | B2 | 5/2004 | Narita |
| 6,761,638 | B1 | 7/2004 | Narita |
| 2006/0046810 | A1 | 3/2006 | Tabata |
| 2009/0143141 | A1* | 6/2009 | Wells et al. .................... 463/37 |

FOREIGN PATENT DOCUMENTS

| | | |
|---|---|---|
| GB | 2417694 | 3/2006 |
| JP | 2001-096069 | 4/2001 |
| JP | 2004-015336 | 1/2004 |
| JP | 2004-070965 | 3/2004 |
| JP | 3767741 | 2/2006 |
| JP | 2006-061317 | 3/2006 |
| JP | 2006-061612 | 3/2006 |
| WO | 03/095050 | 11/2003 |

OTHER PUBLICATIONS

English Language Abstract of JP 2006-061317.
English Language Abstract of JP 2003-190634.
English Language Abstract of JP 2006-061612.
English Language Abstract of JP 2001-096069.

(Continued)

*Primary Examiner*—Pierre E Elisca
(74) *Attorney, Agent, or Firm*—Greenblum & Bernstein, P.L.C.

(57) ABSTRACT

When support appeal reception information is received from a player terminal, a support appeal information transmitter transmits support appeal information for support appeal to other player terminals than the player terminal. In this case, the other player terminals are positioned within a predetermined range from the current position of the player terminal. In the case where support contents information indicating support contents is received from any of the other player terminals in accordance with the support appeal indicated by the support appeal information, a support appeal reply execution information transmitter transmits support appeal reply instruction execution information for instructing the player terminal to execute the support contents indicated by the received support contents information to the player terminal. The player terminal then executes support from the other player terminals in the executing event on the basis of the received support appeal reply instruction execution information.

20 Claims, 10 Drawing Sheets

OTHER PUBLICATIONS

U.S. Appl. No. 11/855,561.
U.S. Appl. No. 11/856,156.
"Weekly FAMI-TSU, a double number for Jun. 9 and 16, 2006 (Before Crisis Final Fantasy. VII)" (Enterbrain, Inc., Jun. 9, 2006, vol. 21, No. 23, p. 90), together with an English language partial translation of the same.

"Weekly FAMI-TSU, Oct. 8, 2004 (Before Crisis Final Fantasy. VII)" (Enterbrain, Inc., Oct. 8, 2004, vol. 19, No. 41, pp. 208-209), together with an English language partial translation of the same.
English language Abstract of JP 2004-015336.
English language Abstract of JP 2004-070965.

* cited by examiner

100: VIDEO GAME DELIVERY SYSTEM

PLAYER POSITION SETTING TABLE

| PLAYER ID | LATEST POSITIONAL INFORMATION | MEASUREMENT TIME OF LATEST POSITIONAL INFORMATION |
|---|---|---|
| 0001 | (xx, yy) | 2006/9/21 10:55 |
| 0002 | (xx, ya) | 2006/9/21 14:01 |
| 0003 | (xx, yb) | 2006/9/19 21:18 |
| 0004 | (xa, yy) | 2006/9/21 15:10 |
| 0005 | (xb, ya) | 2006/9/20 8:05 |
| 0006 | (xc, yy) | 2006/9/21 13:59 |
| ... | ... | ... |

P

PLAYER INFORMATION MANAGEMENT TABLE

| PLAYER ID | E-MAIL ADDRESS | USAGE MODEL | AVAILABILITY OF RECEIVING APPEAL FOR SUPPORT | ... |
|---|---|---|---|---|
| 0001 | abc@xxx.com | 123X | ○ | ... |
| 0002 | bcd@aaa.ne.jp | 224i | ○ | ... |
| 0003 | cde@xxx.co.jp | 456X | ○ | ... |
| 0004 | def@aaa.com | aabi | ○ | ... |
| 0005 | efg@bbb.com | 123Y | ○ | ... |
| 0006 | fgh@ccc.com | aaci | ○ | ... |
| ... | ... | ... | ... | ... |

FIG. 14

TABLE FOR DETERMINATION OF OFFENSIVE POWER

| COMMAND NAME / SEARCH NUMBER | ONE | TWO | ...... |
|---|---|---|---|
| SPECIAL TECHNIQUE A | 1 TIME (NORMAL) | 2 TIMES | ...... |
| SPECIAL TECHNIQUE B | 1 TIME (NORMAL) | 2 TIMES | ...... |
| SPECIAL TECHNIQUE C | 2 TIMES | 4 TIMES | ...... |
| MAGIC A | 1.5 TIMES | 3 TIMES | ...... |
| MAGIC B | 1.8 TIMES | 5 TIMES | ...... |
| DARING TECHNIQUE | 1 TIME (NORMAL) | 2 TIMES | ...... |
| ...... | ...... | ...... | ...... |

VIDEO GAME CONTROL SYSTEM AND A VIDEO GAME CONTROL SERVER

CROSS-REFERENCE TO RELATED APPLICATION

The present disclosure relates to subject matter contained in Japanese Patent Application No. 2006-256531, filed on Sep. 21, 2006, the disclosure of which is expressly incorporated herein by reference in its entirety.

BACKGROUND OF THE INVENTION

1. Field of the Invention

The present invention relates to a technique for controlling at least part of progress of a video game played on each of a plurality of player terminals, which a plurality of players respectively operate, via a communication network.

2. Description of the Related Art

Heretofore, various kinds of so-called network delivery type games are presented. Such a network delivery type game is supplied to a mobile communication terminal such as cellular phone terminal via a communication network such as the Internet. In such a network delivery type game, there are various games such as a role playing game as the video game (RPG; that is, a game in which a player plays a role of a character in a world of the game, and accomplishes a predetermined object while enjoying a process that the character grows through various experiences), for example.

Further, heretofore, there is a game in which positional information is used for control of progress of the game when the game is provided to a mobile communication terminal (for example, see Japanese Patent Application Publication No. 2001-96069 and Japanese Patent No. 3,767,741).

Japanese Patent No. 3,767,741 discloses that positional information of a player obtained by means of measurement using a global positioning system (GPS) is used as data for a game.

Further, Japanese Patent Application Publication No. 2006-61612 discloses a mechanism in which in a video game executed in a mobile communication terminal such as a cellular phone terminal and a personal handyphone system (PHS), when a player character operated by a player comes down to crunch time mainly in a battle scene, by transmitting relief appeal to other players, other player character(s) operated by other player(s) who reply the relief appeal are allowed to take part in the battle, whereby the video game can proceed while players are in cooperation with each other.

The conventional technique as described above discloses that the video game can proceed while players who do not know each other are in cooperation with each other, or the contents of the video game is changed depending on positional information of the player. However, in this technique, there is a limitation with respect to the player to which cooperation can be appealed, and the positional information is utilized only to select specific one among multiple patterns of characters, items and scenarios that are prepared in advance. Therefore, there has been a problem that diversification of the game contents has a limitation.

SUMMARY OF THE INVENTION

It is one object of the present invention to solve the problems described above and to provide a video game control system and a video game control server capable of exchange of players who do not know each other by allowing a player to achieve an event linked to actual map information without limitation of players who may become a target to appeal cooperation as much as possible so long as the players exist geographically and actually near the player (or a player terminal) regardless of whether the player know the other players each other, and of improving player's interest in play of the video game by further diversifying the game contents in a video game in which the positional information is used.

In order to achieve the above object, one aspect of the present invention is directed to a video game control system. The video game control system includes: a plurality of player terminals respectively operated by a plurality of players, a video game being played in each of the plurality of player terminals; and a video game control server for controlling at least part of progress of the video game via a communication network. In this case, each of the player terminals includes a game map display device for displaying a game map on an image display screen on the basis of a request to obtain the game map, the request being transmitted to the video game control server in accordance with a map obtaining specification operation by the player, the game map being delivered from the video game control server.

Each of the player terminals also includes a position measurer that measures a current position of the player terminal in the case where a support appeal specification operation by the player is received during execution of a predetermined event.

Each of the player terminals also includes a support appeal reception information transmitter that transmits support appeal reception information to the video game control server via the communication network, the support appeal reception information including current position information indicating the current position of the player terminal measured by the position measurer, player identification information for uniquely identifying the player and support appeal specification reception information indicating that the support appeal specification operation is received.

Further, in this case, the video game control server includes a game map deliverer that delivers the game map to a player terminal on the basis of a request to obtain the game map from the player terminal.

The video game control server also includes a support appeal information transmitter that transmits, when the support appeal reception information is received from the player terminal, support appeal information for support appeal to other player terminals than the player terminal, the other player terminals being positioned within a predetermined range from the current position of the player terminal.

The video game control server also includes a support appeal reply execution information transmitter that transmits, in the case where support contents information indicating support contents is received from any of the other player terminals in accordance with the support appeal indicated by the support appeal information, support appeal reply instruction execution information for instructing the player terminal to execute the support contents indicated by the received support contents information to the player terminal.

Moreover, in this case, the player terminal executes support from the other player terminals in the executing event on the basis of the received support appeal reply instruction execution information.

Since the video game control system may have the configuration described above, it is possible to It is preferable that the support appeal information transmitter transmits an e-mail to the other player terminals as the support appeal information for support appeal, a URL for access to a support contents reception screen for receiving support contents in the event being provided in the e-mail, and that the support appeal reply execution information transmitter transmits, after receiving the support contents information indicating the support contents specified on the support contents reception screen, the support appeal reply instruction execution information for instructing the player terminal to execute the support contents indicated by the received support contents information in the event to the player terminal.

It is preferable that the support appeal reply execution information transmitter transmits, after receiving the support contents information indicating the support contents such as attack, defense and recovery, the support appeal reply instruction execution information for instructing the player terminal to execute the support contents in a monster event in which a battle against a predetermined monster is executed to the player terminal.

It is preferable that the video game control server further includes: a current position information receiver that receives current position information indicating a current position of each of the other player terminals from the corresponding other player terminal in accordance with the support appeal indicated by the support appeal information; and a support contents information reception determiner that receives the support contents information from each of the other player terminals only in the case where the current position of each of the other player terminals indicated by the current position information received by the current position information receiver is positioned within a predetermined distance range from the current position of the player terminal that has executed the support contents.

It is preferable that the video game control server further comprises a current position information deliverer that delivers current position information indicating the current position of the player terminal to the other player terminals in the case where the current position of each of the other player terminals indicated by the current position information received by the current position information receiver is not positioned within the predetermined distance range from the current position of the player terminal that has executed the support contents.

It is preferable that the position measurer measures the current position of the player terminal on the basis of positioning signals from a plurality of positioning satellites.

Further, in another aspect of the present invention, the present invention is directed to a video game control server for controlling at least part of progress of a video game via a communication network. In this case, the video game is played in each of a plurality of player terminals, and the plurality of player terminals are respectively operated by a plurality of players. The video game control server of the present invention includes a game map deliverer that delivers a game map for causing a display device of a player terminal to display the game map to the player terminal on the basis of a request to obtain the game map from the player terminal in accordance with a map obtaining specification operation by the player of the player terminal.

The video game control server also includes a support appeal information transmitter that transmits, when support appeal reception information is received from the player terminal that receives the support appeal specification operation by the player during execution of a predetermined event, support appeal information for support appeal to other player terminals than the player terminal, the other player terminals being positioned within a predetermined range from the current position of the player terminal, the support appeal reception information including current position information indicating the current position of the player terminal measured by a position measurer that measures a current position of the player terminal, player identification information for uniquely identifying the player and support appeal specification reception information indicating that the support appeal specification operation is received.

The video game control server also includes a support appeal reply execution information transmitter that transmits, in the case where support contents information indicating support contents is received from any of the other player terminals in accordance with the support appeal indicated by the support appeal information, support appeal reply instruction execution information for instructing the player terminal to execute the support contents indicated by the received support contents information in the executing event to the player terminal.

According to the present invention, it is possible to exchange information and the like for (or interact with) players who do not know each other by allowing a player to achieve an event linked to actual map information in cooperation with the players existing geographically and actually near the player (or a player terminal) regardless of whether the player know the other players each other. In addition, it is possible to improve player's interest in play of the video game by further diversifying the game contents in a video game in which the positional information is used.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 14 is an explanatory drawing that shows an example of a table for determination of offensive power.

DETAILED DESCRIPTION OF THE INVENTION

Preferred embodiments of a video game control system and a video game control server according to the present invention will now be described in detail with reference to the appending drawings.

Figure 1:
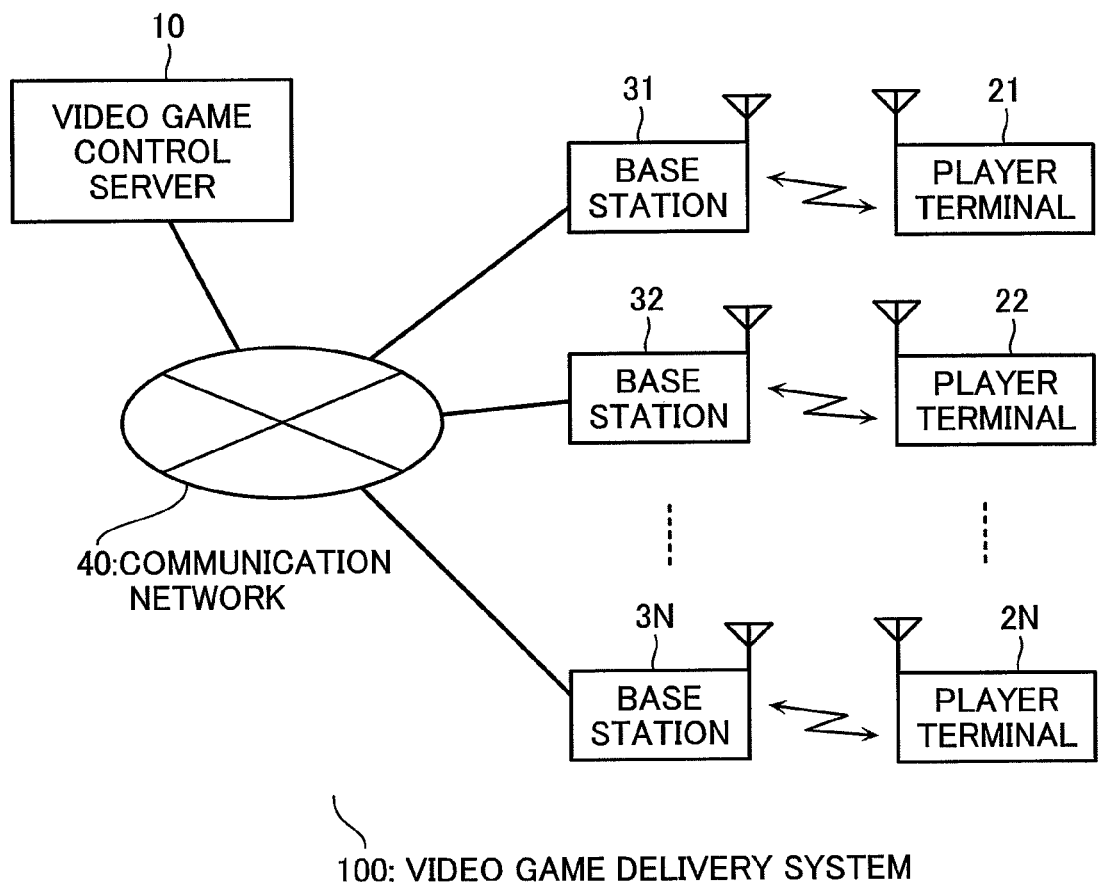
FIG. 1 is a block diagram that illustrates an example of a configuration of a video game delivery system.

FIG. 1 is a block diagram that illustrates an example of a configuration of a video game delivery system 100 according to one embodiment of the present invention. As shown in FIG. 1, the video game delivery system 100 includes the video game control server 10, a plurality of player terminals 21 to 2N ("N" is an arbitrary positive integer) and a plurality of base stations 31 to 3N.

Each of the video game control server 10 and the plurality of base stations 31 to 3N is connected to a communication network 40 such as the Internet. Further, the plurality of player terminals 21 to 2N are respectively connected to the plurality of base stations 31 to 3N with wireless communication. Thus, the plurality of player terminals 21 to 2N are respectively connected to the communication network 40 via the plurality of base stations 31 to 3N.

The video game control server 10 is managed by a system manager (or administrator) of the video game delivery system 100. The video game server 10 has various functions for providing (or delivering) a video game for each of the player terminals 21 to 2N via the communication network 40. The video game control server 10 is constituted from an information processing apparatus such as a WWW server.

The player terminals 21 to 2N are respectively managed by players of the video game. Each of the player terminals 21 to 2N is constituted from a mobile communication terminal in which a network delivery type video game can be played, such as a cellular phone terminal, a personal digital assistant (PDA) and a mobile game device, for example. Each of the player terminals 21 to 2N includes hardware and software for connecting itself to the communication network 40 via the base stations 31 to 3N. Each of the player terminals 21 to 2N includes a display device inside or outside the player terminal itself. The display device has an image display screen constituted from a television apparatus or a liquid crystal display. Further, each of the player terminals 21 to 2N includes a position measuring section 21a, an operation/control section 21b and a terminal information processing section 21c (see FIG. 6). The position measuring section 21a receives positioning signals (GPS signals) from a plurality of GPS satellites, and measures a current position of each of the player terminals 21 to 2N using the received GPS signals. The operation/control section 21b is constructed from operation section including operational buttons operated by the player, for example, and a control section for controlling the whole player terminal 21 or 2N. The terminal information processing section 21c deals with information relating to the player terminal 21 or 2N.

Each of the base stations 31 to 3N is managed by a communication carrier. The base stations 31 to 3N are devices for connecting the player terminals 21 to 2N to the communication network 40 by executing data communication with the player terminals 21 to 2N positioned within a communicable area with wireless communication.

Figure 2:
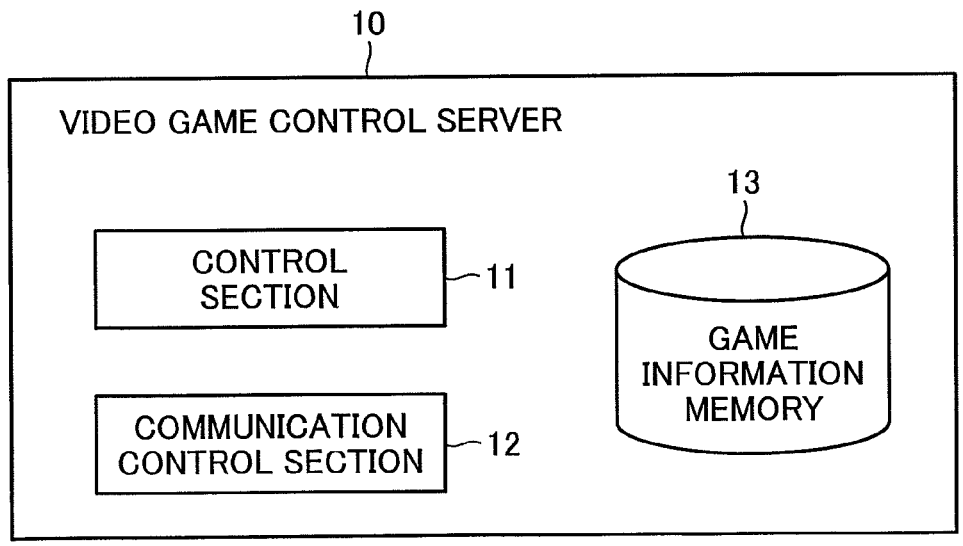
FIG. 2 is a block diagram that illustrates an example of a configuration of a video game control server.

FIG. 2 is a block diagram that illustrates an example of a configuration of the video game control server 10. As shown in FIG. 2, the video game control server 10 includes a control section 11, a communication control section 12, and a game information memory 13.

The control section 11 executes control processes of the whole video game control server 10 in accordance with control programs stored in the game information memory 13.

The communication control section 12 has a function to execute communication between the player terminals 21 to 2N, for example, via the communication network 40 such as the Internet.

The game information memory 13 is constructed from a database apparatus, for example. Various kinds of data such as an event related information table and control programs for the video game are stored in the game information memory 13, which is a storage media.

In this regard, the video game delivered in the present embodiment is an RPG including a portion in which the video game proceeds when a plurality of characters, including a player character (that is, a character that moves in accordance with operations of a keypad by a player), moves on a field provided in a virtual three-dimensional space, or executes a battle against an enemy character that thwarts an action of the player character for accomplishment of a predetermined object in the video game. Further, the virtual three-dimensional space in which the field is formed is indicated by coordinates of the world coordinate system.

Next, an operation of the video game delivery system 100 according to the present embodiment will be described.

Figure 3:
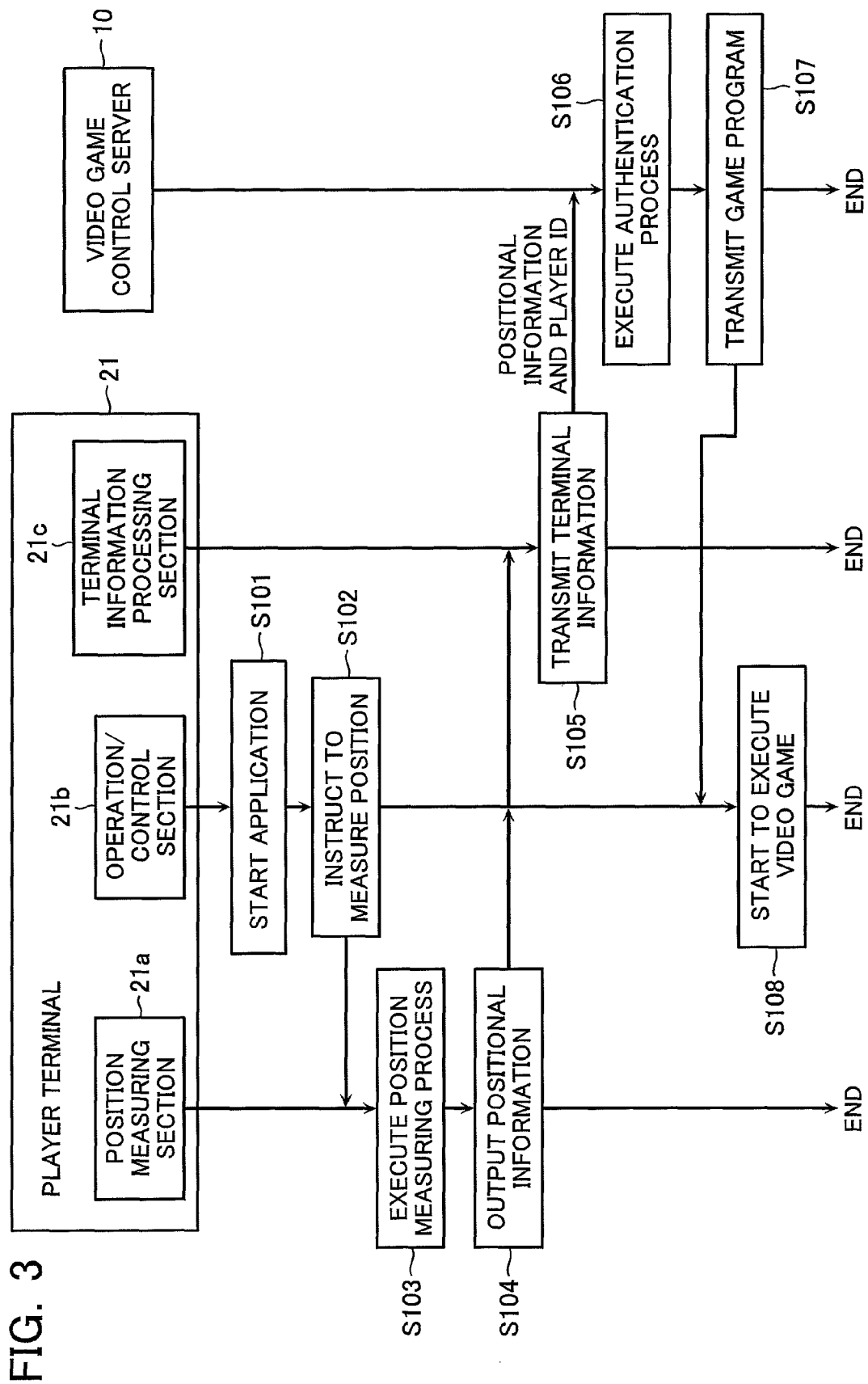
FIG. 3 is a flowchart that illustrates an example of a game start process.
Figure 4:
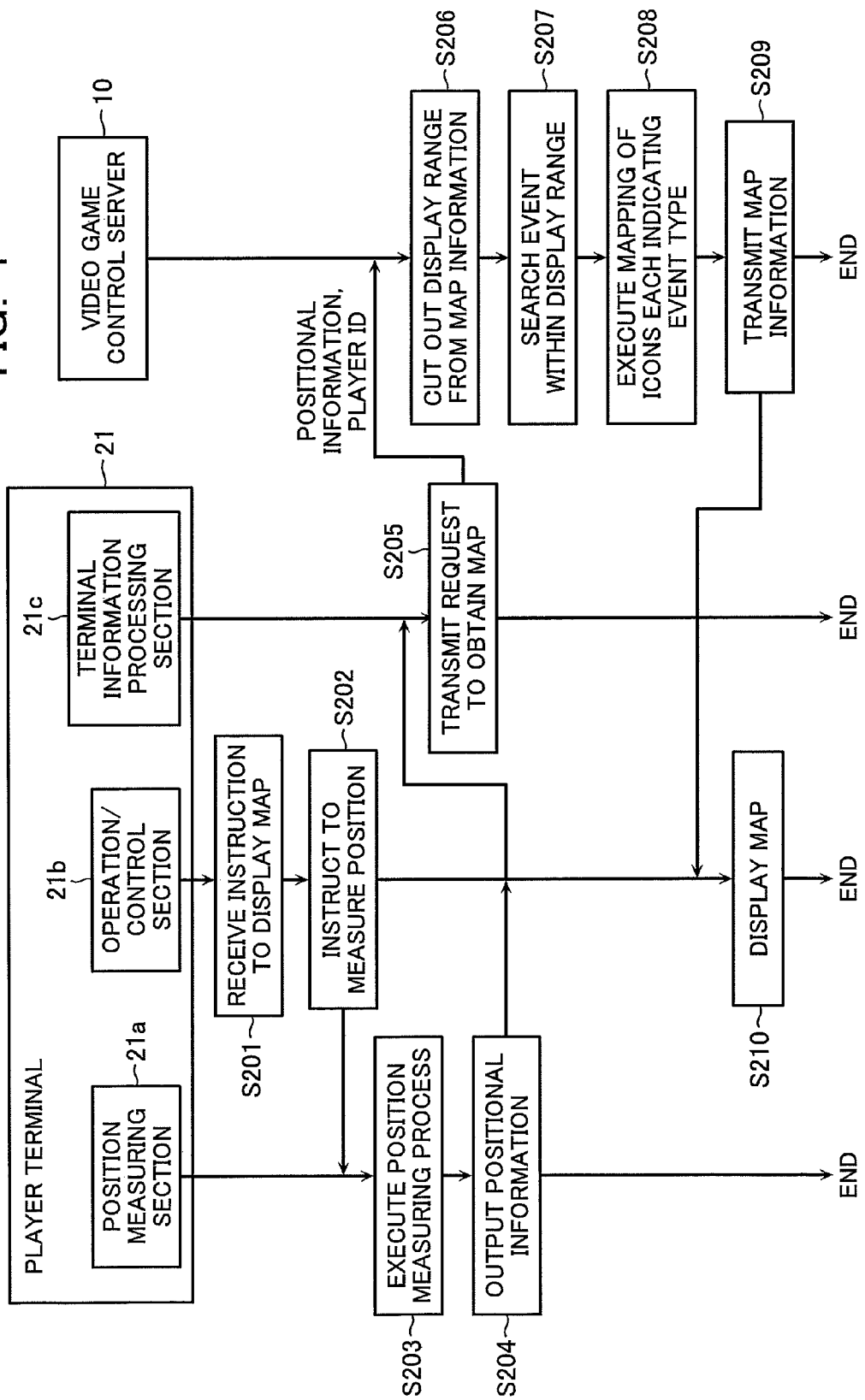
FIG. 4 is a flowchart that illustrates an example of a map delivery process.

FIG. 3 is a flowchart that illustrates an example of a game start process in the video game delivery system 100 of the present embodiment. FIG. 4 is a flowchart that illustrates an example of a map delivery process in the video game delivery system 100 of the present embodiment. Here, in order to simplify the explanation of the game start process and the fusion attack control process, a player P plays a video game G by operating a player terminal 21 of the player P. Further, in order to explain a process for delivering the video game G to the player terminal 21, explanation for any process other than the processes relating to the present invention, in particular, may be omitted.

In the game start process, the operation/control section 21b of the player terminal 21 activates (or starts) a game application for executing the video game G in accordance with an operation of the player P (Step S101). Once the game application is activated, the operation/control section 21b outputs an instruction for measurement of a position of the player terminal 21 to the position measuring section 21a (Step S102). The position measuring section 21a executes a position measuring process for measuring a current position of the player terminal 21 in response to the instruction for position measurement (Step S103), and then outputs positional information indicating the measurement result (Step S104).

When the positional information is received from the position measuring section 21a via the operation/control section 21b, the terminal information processing section 21c creates terminal information including the received positional information and a player ID uniquely applied to the player P, and then transmits the created terminal information to the video game control server 10 via the base station 31 and the communication network 40, for example (Step S105).

When the terminal information is received, the video game control server 10 executes an authentication process using the player ID included in the received terminal information (Step S106). In this case, the authentication process is not limited to one using the player ID, and may be another using other information such as a password or biologic information. In the case where the player P is authenticated, the video game control server 10 stores the current position of the player P (that is, the player terminal 21) by registering the positional information included in the received terminal information in a player position setting table shown in FIG. 5 so that the positional information is associated with the player ID along with the date and time when the registration is executed. The video game control server 10 then transmits a game program (video game program) for delivering the video game G to the player terminal 21 (Step S107). In this regard, registration information in the player position setting table is to be updated whenever the player terminal 21 makes an access to the video game control server 10 for providing the positional information of the player terminal 21.

When the game program is received, the operation/control section 21b of the player terminal 21 starts the game application using the received game program, that is, starts to execute the video game G (Step S108). After the video game G is started, the map delivery process is executed during execution of the video game G.

In the map delivery process, when the operation/control section 21b of the player terminal 21 receives specification of a game map display command by means of an operation of the player P (Step S201), the operation/control section 21b outputs an instruction for measurement of a position of the player terminal 21 to the position measuring section 21a (Step S202). The position measuring section 21a executes a position measuring process for measuring a current position of the player terminal 21 in response to the instruction for position measurement (Step S203), and then outputs positional information indicating the measurement result (Step S204).

When the positional information is received from the position measuring section 21a via the operation/control section 21b, the terminal information processing section 21c creates map obtaining request information, including the received positional information, game map display instruction reception information indicating that the operation/control section 21b received the game map display command at Step S201 and a player ID uniquely applied to the player P, for making a request to obtain a game map, and then transmits the created map obtaining request information to the video game control server 10 via the base station 31 and the communication network 40, for example (Step S205). In this case, when the positional information is received via the operation/control section 21b, the terminal information processing section 21c obtains, from the operation/control section 21b, the game map display instruction reception information indicating that the operation/control section 21b received the game map display command at Step S201.

Figures 5, 6:
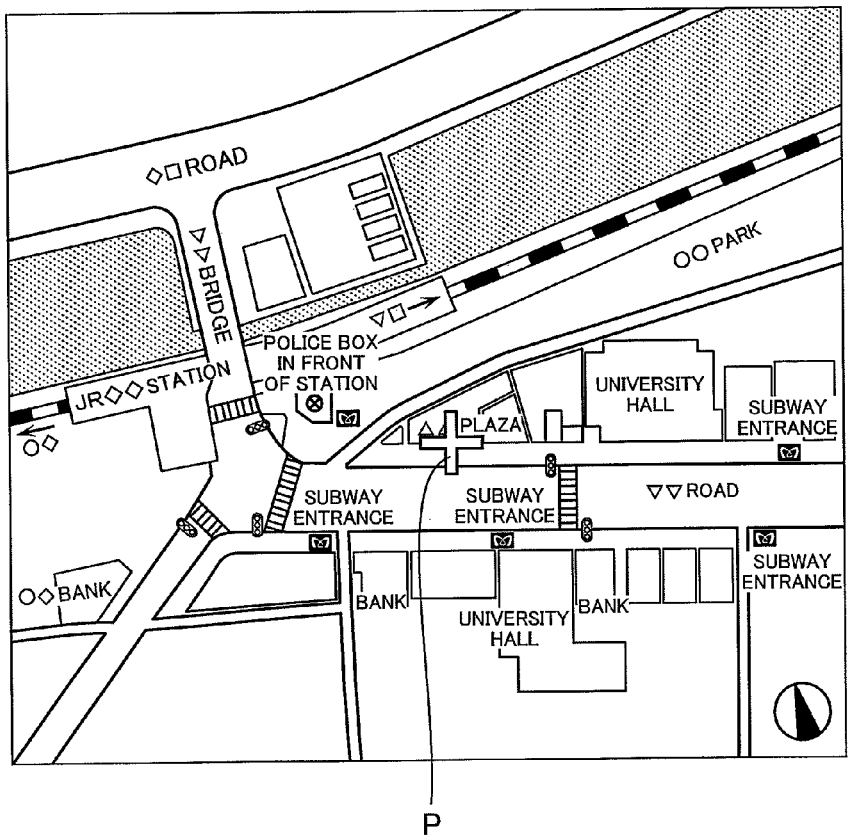
FIG. 5 is an explanatory drawing that shows an example of a player position setting table.
FIG. 6 is an explanatory drawing that shows an example of a map around a current position of a player.
Figures 7, 8:
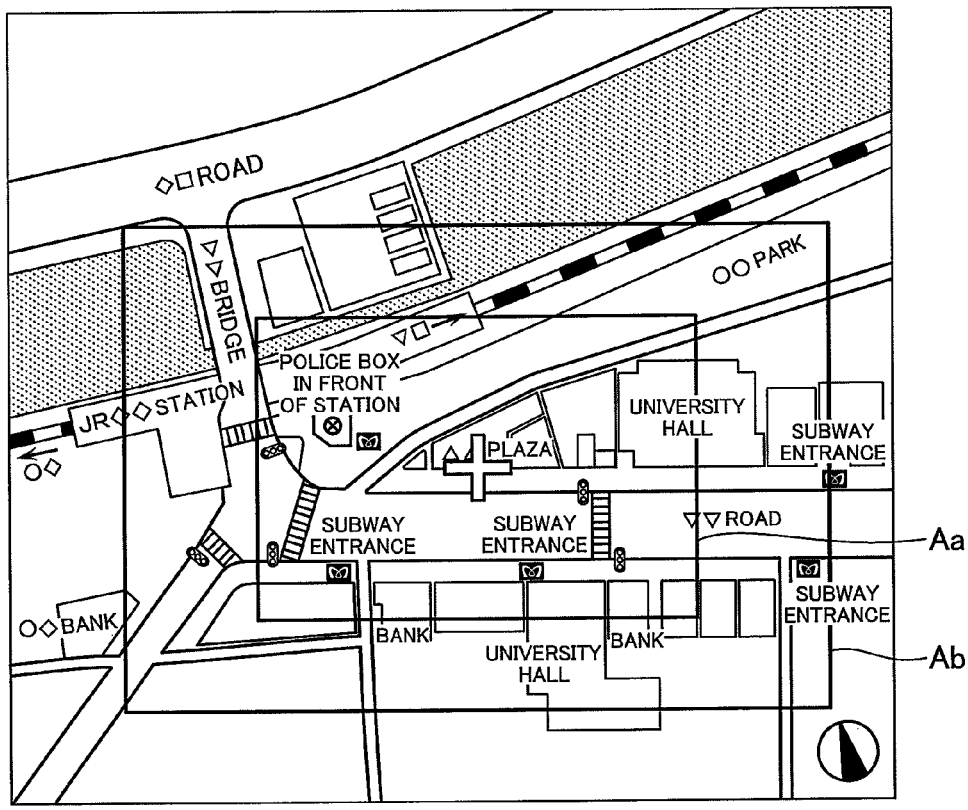
FIG. 7 is an explanatory drawing that shows an example of a displayable range in the map around the current position of the player.
FIG. 8 is an explanatory drawing that shows an example of a player information management table.

When the map obtaining request information is received, the video game control server 10 reads out map information around the position indicated by the positional information included in the received map obtaining request information from the map information stored in the game information memory 13, cuts out an area to be displayed on the player terminal 21 from the read out map information, and determines that the cut out map is a usage map used as a game map (Step S206). Namely, at Step S206, as shown in FIG. 6, the video game control server 10 first reads out a neighboring map of a current position P of the player terminal 21 indicated by the positional information included in the received map obtaining request information. The video game control server 10 executes trimming to cut out an area that a display device with which the player terminal 21 is provided can display on an image display screen (for example, an area "Aa" or area "Ab" shown in FIG. 7), and obtains trimmed map information. In this regard, as for the area that the display device of the player terminal 21 can display on the image display screen, an original displayable range may be set for every type of terminal that a player P uses, for example. In this case, registration of the type of terminal may also be received at a user registration, and the player information management table as shown in FIG. 8 may be created. Thus, the video game control server 10 can recognize the type of terminal for every user P. In this regard, the player information management table is to be updated at any time when the player P changes the types of terminal or e-mail addresses. Therefore, the video game control server 10 can determine whether the display area is set to the area "Aa" or the area "Ab" by referring to information on the type of terminal that the player P used. This makes it possible to automatically determine a displayable range of a map at the video game control server 10. Further, other than the display area of the map as described above, a support appeal deliverable range (will be described later) may be changed depending on the type of terminal that the player P uses. By designing the video game control server 10, the player can consider "which type of terminal is advantageous to carry out player's kind of game progress" when the player changes the type of terminal. This makes it possible to provide game like enjoyment to the player even in change of the type of usage terminal. Such a map display function is utilized when a supporting player who receives support appeal searches the current position of the player to be supported who transmitted the support appeal, or the player experiences an event in the video game relating to the current position of the player in a support appeal process (will be described later).

In this regard, in an update process for the player information management table described above, when terminal information attached by the terminal information processing section 21c of the player terminal 21 is transmitted to the video game control server 10, the video game control server 10 may compare the contents described in the existing player information management table with the contents of the latest received terminal information using the player ID as a key, and automatically update it to the contents of the received terminal information if there is any changed item therein. Thus, it is possible to same player's trouble that the player oneself has to change the player information, and it is also possible to prevent the player from forgetting the change of the player information or making an input miss. Since the player ID uses information that the player cannot change arbitrarily, such as a telephone number corresponding to the terminal that the player uses, and a serial number of a memory medium in which telephone number information is described, it is very difficult for a vicious player to intentionally access the video game control server 10 with a player ID of other player, and to rewrite player information of other player. In order to make assurance doubly sure on the security, for example, critical information such as password to login to the video game program may be set so that such critical information cannot be updated automatically as described above.

In the present embodiment, a player character operated by the player P meets with an enemy character during progress of the video game program, and a battle scene is started. Then, when the player character comes down to crunch time in the battle (for example, when the player P determines that it is difficult for the player character to win the enemy character independently), the player P can output support appeal to other players. Here, a process when the player P outputs support appeal to other players will now be described with reference to FIG. 9 to FIG. 14.

Figure 9:
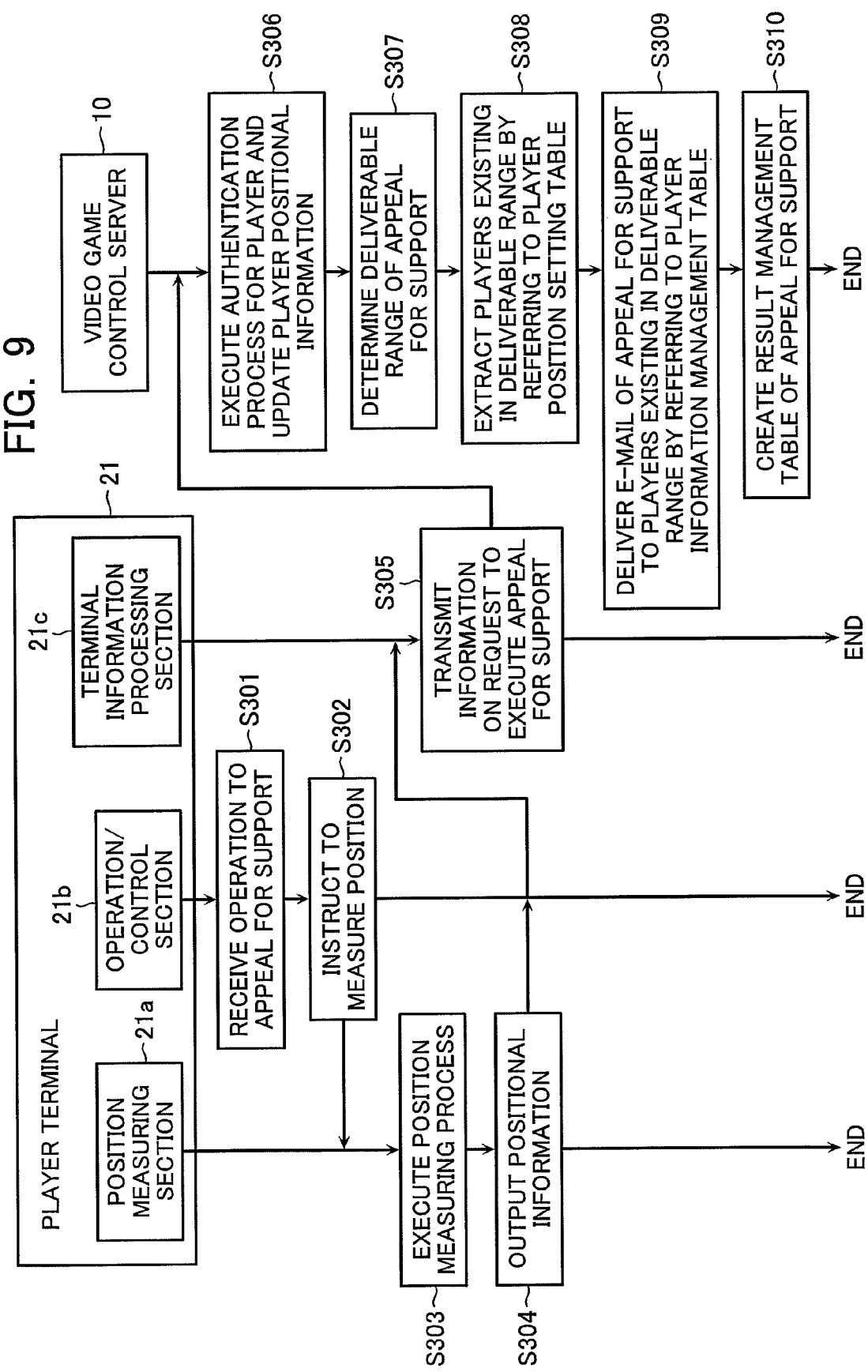
FIG. 9 is a flowchart that illustrates an example of a support appeal process.

In the support appeal process shown in FIG. 9, when specification of a support appeal command by an operation of the player P is received during execution of the event in which the player character battles a monster (Step S301), the operation/control section 21b of the player terminal 21 outputs an instruction for measurement of a position of the player terminal 21 to the position measuring section 21a (Step S302).

The position measuring section 21a executes a position measuring process for measuring a current position of the player terminal 21 in response to the instruction for position measurement (Step S303), and then outputs positional information indicating the measurement result (Step S304).

Figure 10:
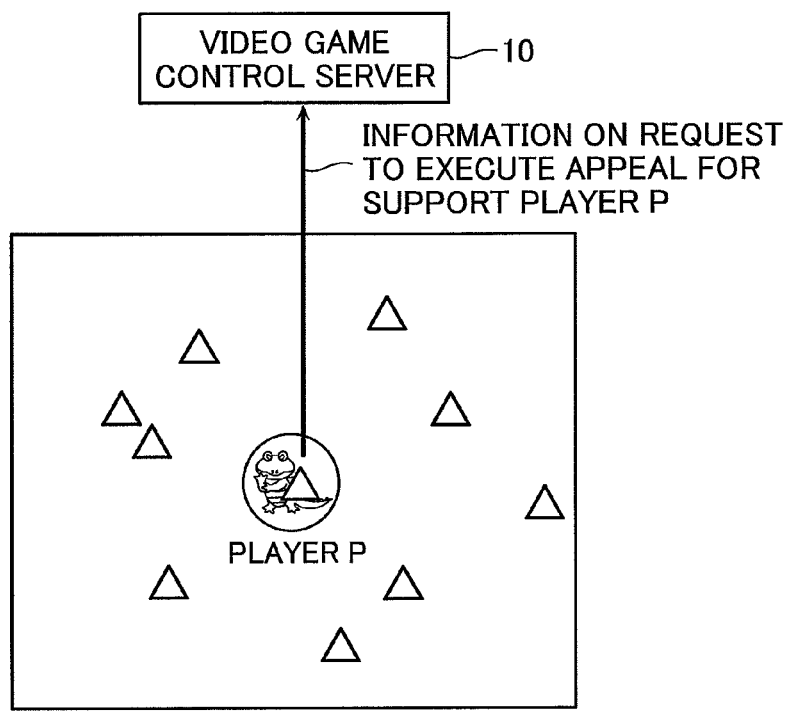
FIG. 10 is a schematic diagram that shows an outline of support appeal to the video game control server from a player terminal.

When the positional information is received from the position measuring section 21a via the operation/control section 21b, the terminal information processing section 21c creates support appeal execution request information including the received positional information, the support appeal reception information indicating that the operation/control section 21b received the support appeal command at Step S301 and a player ID uniquely applied to the player P, and as shown in FIG. 10, for example, then transmits the created support appeal execution request information to the video game control server 10 via the base station 31 and the communication network 40, for example (Step S305). In this case, when the positional information is received via the operation/control section 21b, the terminal information processing section 21c obtains, from the operation/control section 21b, the support appeal reception information indicating that the operation/control section 21b received the support appeal command at Step S301.

When the support appeal execution request information is received, the video game control server 10 executes an authentication process for the player P on the basis of the player ID included in the received support appeal execution request information. In the case where the player P is authenticated, the video game control server 10 updates the registration contents of the player P in the player position setting table using the positional information of the player P included in the received support appeal execution request information (Step S306). Subsequently, the video game control server 10 determines a support appeal deliverable range according to the player information of the player P on the basis of the updated current position of the player P (Step S307). More specifically, the video game control server 10 may determine that a range within a predetermined distance from the current position of the player P is a support appeal deliverable range. In this regard, the range within the predetermined distance from the current position of the player P may be defined for determining the support appeal deliverable range in accordance with the type of usage terminal of the player P registered in the player information management table.

When the support appeal deliverable range of the player P is determined, the video game control server 10 extracts players other than the player P existing within the range by referring to the player position setting table and the player information management table (Step S308). In this case, for example, only the players whose last update date of the current position information registered in the player position setting table is within a predefined period of time from the current time may be extracted. This is because the player whose last update date of the current position information is made at few days ago is thought to currently exist in a different place in the most cases. Further, the player may arbitrarily set information on availability to receive support appeal in the player information management table in advance. Thus, it is possible not to deliver the support appeal to any player who does not want to receive the support appeal. In this case, it is desirable that the information on availability to receive support appeal is set to "permission" at an initial setup.

Figure 11:
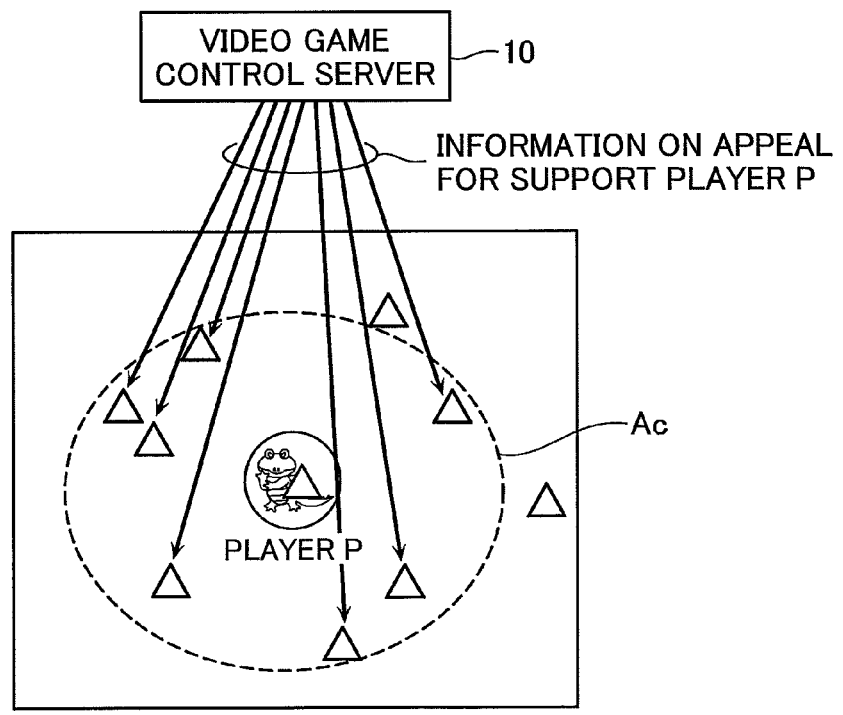
FIG. 11 is a schematic diagram that shows an outline of support appeal to other player terminals from the video game control server.

As a result of Step S308, as shown in FIG. 11, the video game control server 10 specifies seven other player terminals 22 to 28 positioned within a support appeal deliverable range "Ac" (hereinafter, referred to as "support appeal delivery player terminals"), for example. The video game control server 10 then searches e-mail addresses set in the support appeal delivery player terminal 22 to 28 by referring to the player information management table, and delivers support appeal information to the support appeal delivery player terminal 22 to 28 via an e-mail using the searched e-mail addresses as shown in FIG. 11, for example (Step S309). A Uniform Resource Locator (URL) for access to an event appeal screen is displayed in this e-mail. The event appeal screen is used to support the player character acting by an operation of the player P in a battle scene that the player terminal 21 currently executes.

When the support appeal information is delivered, the video game control server 10 creates a support appeal result management table including a player ID indicating the player P of the player terminal 21 who outputs the support appeal, and a player ID indicating any player of the support appeal delivery player terminal 22 to 28 who may receive the support appeal information (hereinafter, referred to as a "support appeal reception player"), and stores it in the game information memory 13 (Step S310).

Figure 12:
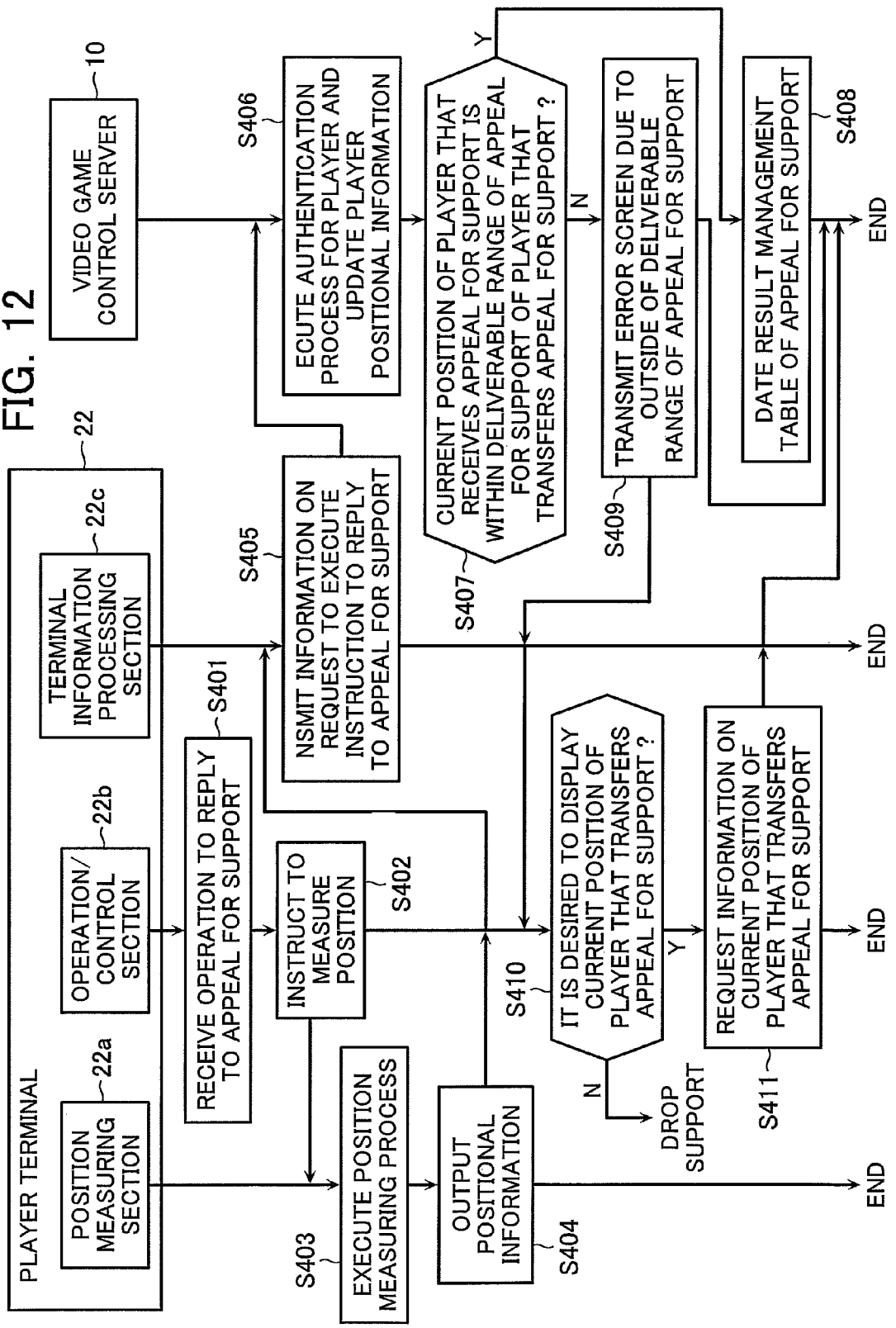
FIG. 12 is a flowchart that illustrates an example of a support reply process.

Next, an operation when the support appeal delivery player terminal that received the support appeal information replies (or makes a response) to the support appeal in accordance with an operation of the support appeal reception player and an operation when the support appeal delivery player terminal that received the support appeal information rejects the support appeal will be described with reference to FIG. 12. Here, in order to simplify the explanation, the case where the player terminal (support appeal delivery player terminal) 22 used by the player P2 who is a support appeal reception player receives the support appeal information will be described as an example. When the delivery of the support appeal information is received, the player terminal 22 receives a support appeal reply instruction operation by the player P2 (Step S401). In the present embodiment, the access to the URL in which a support appeal request indicated by the support appeal information is published corresponds to the support appeal reply instruction operation.

When the operation/control section 22b of the player terminal 22 detects support appeal reply instruction, the operation/control section 22b outputs an instruction for measurement of a position of the player terminal 21 to the position measuring section 21a (Step S402). The position measuring section 22a executes a position measuring process for measuring a current position of the player terminal 22 in response to the instruction for position measurement (Step S403), and then outputs positional information indicating the measurement result (Step S404).

When the positional information is received from the position measuring section 22a via the operation/control section 22b, the terminal information processing section 22c creates support appeal reply instruction execution information including the received positional information, support appeal replay instruction reception information indicating that the operation/control section 22b received the support appeal reply instruction at Step S401 and a player ID applied to the player P, and then transmits the created support appeal reply instruction execution information to the video game control server 10 via the base station 32 and the communication network 40, for example (Step S405). In this case, when the positional information is received via the operation/control section 22b, the terminal information processing section 22c obtains the support appeal replay instruction reception information indicating that the operation/control section 22b received the support appeal reply instruction at Step S401 from the operation/control section 22b.

The video game control server 10 executes an authentication process for the player P2 on the basis of the player ID included in the support appeal reply instruction execution request information transmitted from the terminal information processing section 22c of the player terminal 22. In the case where the player P2 is authenticated, the video game control server 10 updates latest positional information and measurement time of the latest positional information of the player P2 registered in the player position setting table using the positional information of the player P2 included in the received support appeal replay instruction execution request information (Step S406).

The video game control server 10 grasps the latest current position information of the player P2 on the basis of data in the updated player position setting table, and determines whether or not the current position of the player P2 is positioned within the support appeal deliverable range determined on the basis of the current position of the player P (hereinafter, referred to as a "support appeal transmission player") who outputs (or transmits) the support appeal (Step S407). As a result, in the case where it is determined that the current position of the player P2 is positioned within the support appeal deliverable range of the player P ("Yes" at Step S407), the video game control server 10 updates the support appeal result management table (Step S408). On the other hand, it is determined that the current position of the player P2 is positioned outside the support appeal deliverable range of the player P ("No" at Step S407), the video game control server 10 transmits an error screen to notify that the current position of the player P2 is positioned outside the support appeal deliverable range to the player terminal 22 of the player P2 (Step S409).

An instruction button to execute the display of the current position of the support appeal transmission player P and an instruction button to instruct to give up the support are displayed in the error screen described above in consideration of the case where the player P2 positively desires the support for the player P. Since the player P2 moves to the inside of the support appeal deliverable range of the player P to support the player P, it is required to grasp the current position of the player P. In the case where the player terminal 22 to which the error screen is delivered receives a depress operation of the instruction button by the player P2 for instructing to give up the support ("No" at Step S410), the support is given up and the processing flow is terminated as it is while ignoring the support appeal. On the other hand, in the case where the player terminal 22 receives a depress operation of the instruction button by the player P2 for instructing to display the current position of the player P ("Yes" at Step S410), the operation/control section 22b of the player terminal 22 transmits a request to obtain the current position information of the support appeal transmission player P to the video game control server 10 via the terminal information processing section 22c with which the player terminal 22 is provided (Step S411).

Figure 13:
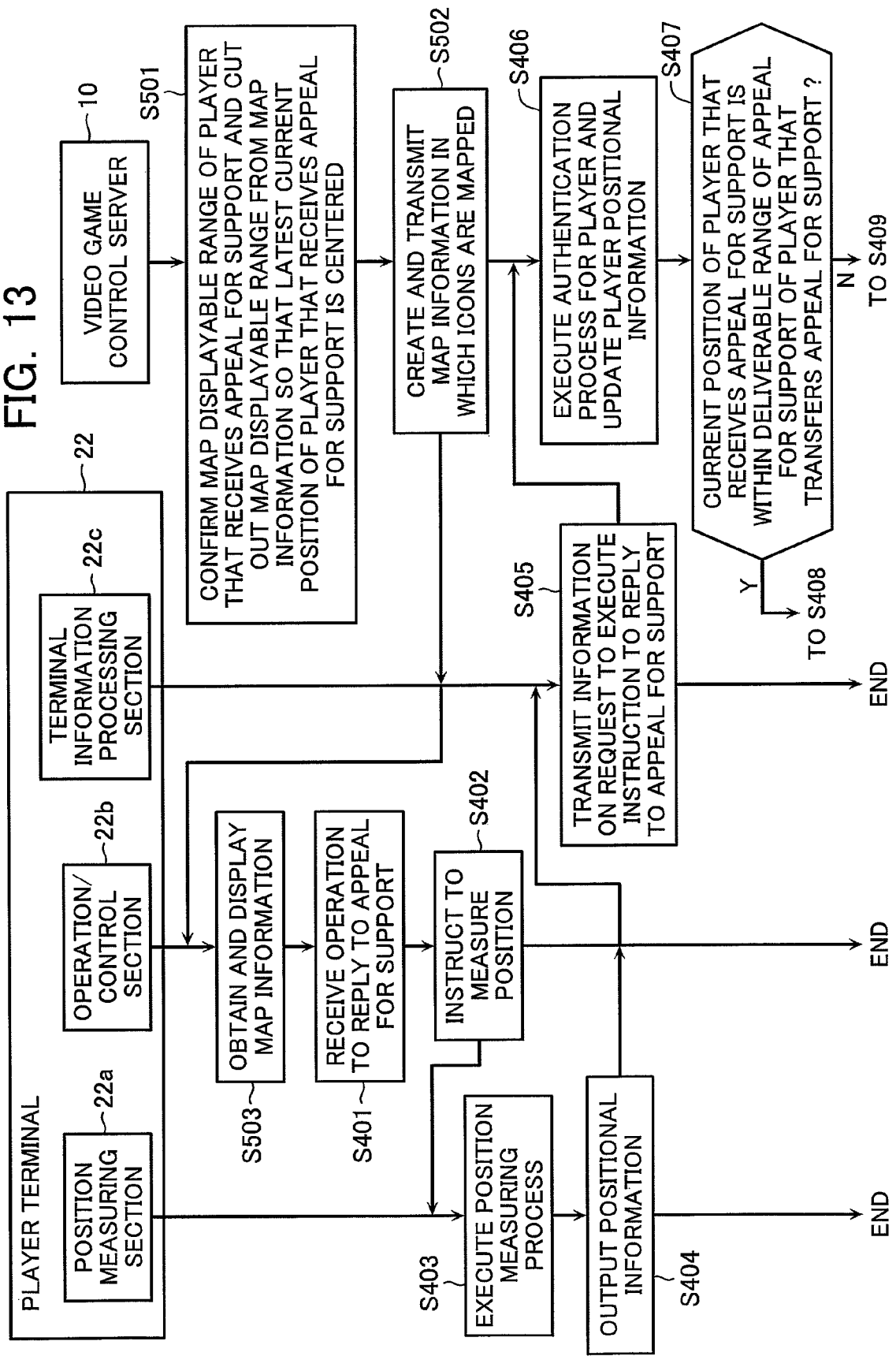
FIG. 13 is a flowchart that illustrates an example of a support reply process.

Next, a process when the supporting player P2 executes an instruction to request to display the current position of the player P to be supported will be described with reference to FIG. 13. When the request to obtain the current position information of the player P to be supported from the player terminal 22 is received, the video game control server 10 refers to the player position setting table to confirm the latest the current position of the player P, and refers to the player information management table to confirm a map displayable range set to the supporting player P2. The video game control server 10 then cuts out the corresponding area of the map information while the current position of the support appeal transmission player P is centered (Step S501).

Subsequently, the video game control server 10 maps an icon each indicating the current position of the support appeal transmission player P on the cut out map information, and transmits the map information on which the current position of the mapped support appeal transmission player to the player terminal 22 (Step S502).

The operation/control section 22b of the player terminal 22 receives the map information on which the current position of the support appeal transmission player is displayed, and displays the map indicated by the received map information on the image display screen of the display device in the player terminal 22 (Step S503). In this case, a message "approach a place within a radius Xm from the current position of the player" may be displayed together with the received map information. The support appeal reception player P2 moves toward the current position of the support appeal transmission player P while carrying the player terminal 22 and referring to the displayed map information. In this case, by confirming the player's own position using the map display function described above while moving, it is possible to approach the current position of the support appeal transmission player P with high accuracy. When the support appeal reception player P2 determines to move within the support appeal deliverable range of the support appeal transmission player P sufficiently, the support appeal reception player P2 again accesses the URL described in the support appeal e-mail delivered at Step S309. Then, the support appeal reception player P2 repeats the processes after Step S401 until the support is carried out.

However, in the case where a time limitation to allow the support appeal is provided, the support may not be carried out due to the time limitation even though the support appeal reception player P2 moves to the inside of the support appeal deliverable range of the support appeal transmission player P to execute a support appeal reply instruction again. In this case, an error screen for notifying that the support cannot be carried out because of excess of the limited time is transmitted to the player terminal 22 from the video game control server 10. Further, even though a time limitation is not particularly provided, when the support appeal reception player P2 terminates the corresponding battle scene before a next support appeal reply instruction is carried out, an error screen for notifying that the support cannot be carried out because the corresponding battle scene has already been terminated is transmitted to the player terminal 22 from the video game control server 10.

When the reply instruction against support appeal registered in the support appeal result management table, the supporting players are allowed to support the support appeal transmission player by issuing respective predetermined commands. Support contents information indicating that which command the support appeal reception player specifies to carry out the support is transmitted to the video game control server 10, and the specified command is activated together with a command specified by the support appeal transmission player at an attack operation for the player character by the support appeal transmission player. In this case, the support contents specified by the supporting player are registered in the support appeal result management table at any time. Thus, the player to be supported is allowed to obtain an attack effect of multiple attacks by one attack. Further, in this case, the kind of support is not particularly limited to attacks so long as it is an effective method to advantageously fight a battle, such as "recovery", "magic" and "provision of an item".

When the support appeal transmission player activates an attack command under a supported state, the video game control server 10 refers to the support information specified by the support appeal reception player and stored in the support appeal result management table to confirm the command specified by the supporting player. In this case, in the case where there is a command identical to the command specified by the player in the confirmed command information, an effect such as attack power (offensive power) or recovery power of the command specified by the player to be supported can be significantly increased in accordance with the number of existing commands stored in the support result management table. The attack by which such a special effect is obtained is conveniently called to a "fusion attack".

Although the effect of the fusion attack is amplified in accordance with the number of existing same commands stored in the referred support result management table, an amplification factor may be differentiated depending on the specified command. In such a case, an offensive power determination table as shown in FIG. 14 may be prepared on the video game control server 10 separately.

Further, in order to effectively activate a fusion attack, the video game control server 10 may be designed so that when the support appeal transmission player executes support appeal, the support appeal transmission player can inform of the support appeal reception player how or what method the support appeal transmission player wants to support, for example, "want to support with "kesagiri". A message to specify a support method from the support appeal transmission player may be automatically reflected to a message body or title of an e-mail to be transmitted to the support appeal information. In this case, the player receiving the e-mail for the support appeal is allowed to grasp a support method desired by the support appeal transmission player before carrying out the support actually.

Namely, since the video game control server 10 is constructed in the manner as described above, the effect of the support is to be changed depending on a storage state of commands that the supporting players activate until the player to be supported knocks down an enemy character during the battle (that is, the value indicating offensive power or life power the enemy character becomes zero) or the player character operated by the player to be supported is knocked down by the enemy character from the support appeal reply instruction information is first registered in the support result management table. In addition, since the storage effect of the fusion attack becomes larger as the time passes, probability to apply greater attack effect to the enemy character becomes higher as the battle drags on. This makes it possible to prevent the player from reducing interest in the video game due to drag-on of the battle scene.

On the other hand, in the case where the player continues to activate the same commands to activate a fusion attack, the battle scene in the video game becomes monotonous. This also leads to decrease or reduction of the interest of the player in the video game. Thus, once the commands stored in the support result management table are referred to for activating a fusion attack, the record of the commands may be designed so as to be cleared (or deleted) at the time when the fusion attack is activated. Alternatively, the record of the commands may be designed so that the stored data disappear in turn when a predetermined period of time (for example, one minute) elapses after they have been recorded in the support result management table. Moreover, the video game control server 10 may be designed so that the player can select and set a given pattern among such patterns.

In the manner as described above, in the case where an event executed in the player terminal 21 is a monster appearance event, support appeal for the player character executing a battle against a monster is carried out to other player terminals in the event, such a player can receive the support from the other player terminals. In this regard, although it is not particularly referred to in the embodiment described above, the player receiving the support or the video game control server 10 may apply a privilege such as an item to the other player carrying out the effective (or available) support. In such a case, it can be expected that players replying support appeal are further increased. Moreover, according to the present invention, a new idea or plan that the supporting player searches the current position of the player to be supported and moves thereto actually can be added to the conventional video game. In the case where such a supporting player moves all the way to the current position of the player to be supported to support him or her, achievement to success the support becomes greater. This makes it possible to heighten the degree of satisfaction of the player.

As explained above, in the embodiment described above, the video game control system (in the present embodiment, the video game delivery system 100) is constructed as follows. Namely, the video game control system includes: the plurality of player terminals 21 to 2N respectively operated by a plurality of players in each of which a video game G is played; and a video game control server 10 for controlling at least part of progress of the video game via the communication network 40. Namely, any of the player terminals 21 to 2N includes a game map display function for displaying a game map delivered from the video game control server 10 on an image display screen on the basis of a request to obtain the game map, which is transmitted to the video game control server 10 in accordance with a map obtaining specification operation by the player; measures a current position of the player terminal 21 in the case where a support appeal specification operation by the player is received during execution of a battle scene; and transmits support appeal reception information, including current position information indicating the measured current position of the player terminal 21, player identification information for uniquely identifying the player and support appeal specification reception information indicating that the support appeal specification operation is received, to the video game control server 10 via the communication network 40. Further, when the support appeal reception information is received from the player terminal 21, the video game control server 10 transmits support appeal information for support appeal to other player terminals 22 to 28 than the player terminal 21, which are positioned within a predetermined range from the current position of the player terminal 21; and, in the case where support contents information indicating support contents is received from any of the other player terminals 22 to 28 in accordance with the support appeal indicated by the support appeal information, transmits support appeal reply instruction execution information for instructing the player terminal 21 to execute the support contents indicated by the received support contents information in the battle scene to the player terminal 21. The player terminal 21 then executes support from the other player terminals 22 to 24 in the executing battle scene on the basis of the received support appeal reply instruction execution information. Since the video game control server 10 has the configuration described above, it is possible to exchange information and the like for (or interact with) players who do not know each other by allowing a player to achieve an event linked to actual map information in cooperation with the players existing geographically and actually near the player (or a player terminal) regardless of whether the player know the other players each other. In addition, it is possible to improve player's interest in play of the video game by further diversifying the game contents in a video game in which the positional information is used. In addition, it is possible to unpredictably change the contents of a video game using positional information indicating a position of a player. It is also possible to further diversify the game contents in a video game in which the positional information is used. This makes it possible to improve player's interest in play of the video game.

Namely, it is determined whether or not there is support from other players in the executing event and the contents of the support is determined in the case where there is the support on the basis of not only the current position of the player but also the current position of the other players and replay results from the other players (whether or not the other player replies to the support appeal, and the contents of support). Thus, it is possible to unpredictably change the contents of a video game. Therefore, it is possible to add a new idea or plan to the video game, and it is possible to further diversify the game contents in the video game depending on the position of a player even though the game contents are the same.

Further, in the embodiment described above, the video game control server 10 is constructed so as to create a game map on which an event icon image is displayed for recognizing an event occurrence area in accordance with a request to obtain the game map from the player terminal 21, and transmit the created game map to the player terminal 21. Thus, the player is allowed to recognize the event occurrence area easily. In this case, by utilizing an image different from a current position icon for the supporting player as a current position icon for the player to be supported, the player may be allowed to recognize the current position of which player the displayed current position icon indicates.

In this regard, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

The present invention can be applied to a video game control system and the like that includes a plurality of player terminals respectively operated by a plurality of players and a video game control server that controls at least part of progress of a video game played in each of the plurality of player terminals in response to an operation by a player. Therefore, the present invention is useful.

What is claimed is:
1. A video game control system comprising:
a plurality of player terminals respectively operated by a plurality of players, a video game being played in each of the plurality of player terminals; and
a video game control server that controls at least part of progress of the video game via a communication network,
wherein each of the player terminals comprises:
a game map display device that displays a game map on an image display screen on the basis of a request to obtain the game map, the request being transmitted to the video game control server in accordance with a map obtaining specification operation by the player, the game map being delivered from the video game control server;
a position measurer that measures a current position of the player terminal when a support appeal specification operation by the player is received during execution of a predetermined event; and
a support appeal reception information transmitter that transmits support appeal reception information to the video game control server via the communication network, the support appeal reception information including current position information indicating the current position of the player terminal measured by the position measurer, player identification information for uniquely identifying the player and support appeal specification reception information indicating that the support appeal specification operation is received,
wherein the video game control server comprises:
a game map deliverer that delivers the game map to a player terminal on the basis of a request to obtain the game map from the player terminal;
a player terminal positional information storage that stores the player terminal positional information is association with the player identification information on the player terminal, the present positional information, which shows present position of the player terminal, and the date and time information which indicated a date when the present positional information is stored;
a player terminal positional information updater that renews the present positional information of the player terminal in the player terminal positional information and the date and time information every time an access by which the respective present positional information showing the respective present position from the player terminal is presented,
a support appeal information transmitter that refers to player terminal positional information, when the support appeal reception information is received from the player terminal, and transmits support appeal information for support appeal to player terminals other than the player terminal, the other player terminals being positioned within a predetermined range from the current position of the player terminal; and the date an time shown by the date and time information is within a prescribed time from the present time; and
a support appeal reply execution information transmitter that transmits, when support contents information, indicating support contents, is received from any of the other player terminals in accordance with the support appeal indicated by the support appeal information, support appeal reply instruction execution information for instructing the player terminal to execute the support contents indicated by the received support contents information to the player terminal, and
wherein the player terminal executes support from the other player terminals in the executing event on the basis of the received support appeal reply instruction execution information.

2. The video game control system according to claim 1, wherein the support appeal information transmitter transmits an e-mail to the other player terminals as the support appeal information for support appeal, a URL for access to a support contents reception screen for receiving support contents in the event being provided in the e-mail, and
wherein the support appeal reply execution information transmitter transmits, after receiving the support contents information indicating the support contents specified on the support contents reception screen, the support appeal reply instruction execution information for instructing the player terminal to execute the support contents indicated by the received support contents information in the event to the player terminal.

3. The video game control system according to claim 2, wherein the support appeal reply execution information transmitter transmits, after receiving the support contents information indicating the support contents such as attack, defense and recovery, the support appeal reply instruction execution information for instructing the player terminal to execute the support contents in a monster event in which a battle against a predetermined monster is executed to the player terminal.

4. The video game control system according to claim 3, wherein the position measurer measures the current position of the player terminal on the basis of positioning signals from a plurality of positioning satellites.

5. The video game control system according to claim 2, wherein the video game control server further comprises:
a current position information receiver that receives current position information indicating a current position of each of the other player terminals from the corresponding other player terminal in accordance with the support appeal indicated by the support appeal information; and
a support contents information reception determiner that receives the support contents information from each of the other player terminals only when the current position of each of the other player terminals indicated by the current position information received by the current position information receiver is positioned within a predetermined distance from the current position of the player terminal that has executed the support contents.

6. The video game control system according to claim 2, wherein the position measurer measures the current position of the player terminal on the basis of positioning signals from a plurality of positioning satellites.

7. The video game control system according to claim 1, wherein the video game control server further comprises:
a current position information receiver that receives current position information indicating a current position of each of the other player terminals from the corresponding other player terminal in accordance with the support appeal indicated by the support appeal information; and
a support contents information reception determiner that receives the support contents information from each of the other player terminals only when the current position of each of the other player terminals indicated by the current position information received by the current position information receiver is positioned within a predetermined distance from the current position of the player terminal that has executed the support contents.

8. The video game control system according to claim 7, wherein the video game control server further comprises a current position information deliverer that delivers current position information indicating the current position of the player terminal to the other player terminals when the current position of each of the other player terminals indicated by the current position information received by the current position information receiver is not positioned within the predetermined distance from the current position of the player terminal that has executed the support contents.

9. The video game control system according to claim 7, wherein the position measurer measures the current position of the player terminal on the basis of positioning signals from a plurality of positioning satellites.

10. The video game control system according to claim 1, wherein the position measurer measures the current position of the player terminal on the basis of positioning signals from a plurality of positioning satellites.

11. A video game control server for controlling at least part of progress of a video game via a communication network, the video game being played in each of a plurality of player terminals, the plurality of player terminals being respectively operated by a plurality of players, the video game control server comprising:
a game map deliverer that delivers a game map for causing a display device of a player terminal to display the game map to the player terminal on the basis of a request to obtain the game map from the player terminal in accordance with a map obtaining specification operation by the player of the player terminal;
a player terminal positional information storage that stores the player terminal positional information in association with the player identification information on the player terminal, the present positional information which shows present position of the player terminal, and the date and time information which indicated a date when the present positional information is stored;
a player terminal positional information updater that renews the present positional information of the player terminal in layer terminal positional information and the date and time information every time an access by which the present positional information showing the respective present position from the player terminal, is presented;
a support appeal information transmitter that refers to player terminal positional information, when support appeal reception information is received from the player terminal that receives the support appeal specification operation by the player during execution of a predetermined event, support and transmits appeal information for support appeal to player terminals other than the player terminal, the other player terminals being positioned within a predetermined range from the current position of the player terminal, the support appeal reception information including current position information indicating the current position of the player terminal measured by a position measurer that measures a current position of the player terminal, and the date and time shown by the date and time information is within a prescribed time from the present time, player identification information for uniquely identifying the player and support appeal specification reception information indicating that the support appeal specification operation is received; and
a support appeal reply execution information transmitter that transmits, when support contents information indicating support contents is received from any of the other player terminals in accordance with the support appeal indicated by the support appeal information, support appeal reply instruction execution information for instructing the player terminal to execute the support contents indicated by the received support contents information in the executing event to the player terminal.

12. The video game control server according to claim 11, wherein the support appeal information transmitter transmits an e-mail to the other player terminals as the support appeal information for support appeal, a URL for access to a support contents reception screen for receiving support contents in the event being provided in the e-mail, and
wherein the support appeal reply execution information transmitter transmits, after receiving the support contents information indicating the support contents specified on the support contents reception screen, the support appeal reply instruction execution information for instructing the player terminal to execute the support contents indicated by the received support contents information in the event to the player terminal.

13. The video game control server according to claim 12, wherein the support appeal reply execution information transmitter transmits, after receiving the support contents information indicating support contents such as attack, defense and recovery, the support appeal reply instruction execution information for instructing the player terminal to execute the support contents in a monster event in which a battle against a predetermined monster is executed to the player terminal.

14. The video game control server according to claim 13, wherein the position measurer measures the current position of the player terminal on the basis of positioning signals from a plurality of positioning satellites.

15. The video game control server according to claim 12, further comprising:
   a current position information receiver that receives current position information indicating a current position of each of the other player terminals from the corresponding other player terminal in accordance with the support appeal indicated by the support appeal information; and
   a support contents information reception determiner that receives the support contents information from each of the other player terminals only when the current position of each of the other player terminals indicated by the current position information received by the current position information receiver is positioned within a predetermined distance from the current position of the player terminal that has executed the support contents.

16. The video game control server according to claim 12, wherein the position measurer measures the current position of the player terminal on the basis of positioning signals from a plurality of positioning satellites.

17. The video game control server according to claim 11, further comprising:
   a current position information receiver that receives current position information indicating a current position of each of the other player terminals from the corresponding other player terminal in accordance with the support appeal indicated by the support appeal information; and
   a support contents information reception determiner that receives the support contents information from each of the other player terminals only when the current position of each of the other player terminals indicated by the current position information received by the current position information receiver is positioned within a predetermined distance from the current position of the player terminal that has executed the support contents.

18. The video game control server according to claim 17, further comprising a current position information deliverer that delivers current position information indicating the current position of the player terminal to the other player terminals when the current position of each of the other player terminals indicated by the current position information received by the current position information receiver is not positioned within the predetermined distance from the current position of the player terminal that has executed the support contents.

19. The video game control server according to claim 17, wherein the position measurer measures the current position of the player terminal on the basis of positioning signals from a plurality of positioning satellites.

20. The video game control server according to claim 11, wherein the position measurer measures the current position of the player terminal on the basis of positioning signals from a plurality of positioning satellites.

* * * * *